US012802985B2

(12) United States Patent
Kawaguchi et al.

(10) Patent No.: US 12,802,985 B2
(45) Date of Patent: Nov. 17, 2026

(54) ENERGY STORAGE DEVICE

(71) Applicant: GS Yuasa International Ltd., Kyoto (JP)

(72) Inventors: Kazuki Kawaguchi, Kyoto (JP); Jun Oyama, Kyoto (JP); Taisei Sekiguchi, Kyoto (JP); Tomonori Kako, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 935 days.

(21) Appl. No.: 17/910,456

(22) PCT Filed: Mar. 10, 2021

(86) PCT No.: PCT/JP2021/009403
§ 371 (c)(1),
(2) Date: Sep. 9, 2022

(87) PCT Pub. No.: WO2021/182488
PCT Pub. Date: Sep. 16, 2021

(65) Prior Publication Data
US 2023/0163302 A1 May 25, 2023

(30) Foreign Application Priority Data
Mar. 11, 2020 (JP) ................................ 2020-042462

(51) Int. Cl.
*H01M 4/587* (2010.01)
*H01M 4/02* (2006.01)

(52) U.S. Cl.
CPC ...... *H01M 4/587* (2013.01); *H01M 2004/021* (2013.01); *H01M 2004/027* (2013.01)

(58) Field of Classification Search
CPC .... H01M 4/587; H01M 4/5825; H01M 4/583; H01M 2004/021; H01M 2004/027;
(Continued)

(56) References Cited

U.S. PATENT DOCUMENTS 5,795,678 A * 8/1998 Takami ................ H01M 4/587 429/209
9,099,745 B2 8/2015 Nishimura et al.
(Continued)

FOREIGN PATENT DOCUMENTS

CN 108140851 A * 6/2018 ........... H01M 10/54
JP 2003146636 A * 5/2003
(Continued)

OTHER PUBLICATIONS

JP_2003146636_A Original File and Translation (Year: 2003).*
(Continued)

*Primary Examiner* — Mark Ruthkosky
(74) *Attorney, Agent, or Firm* — RANKIN, HILL & CLARK LLP

(57) ABSTRACT

An energy storage device according to an aspect of the present invention includes a negative electrode and a positive electrode, the negative electrode includes a negative substrate and a negative active material layer directly or indirectly layered on the negative substrate, the negative active material layer contains a negative active material, the negative active material contains solid graphite particles as a main component, the aspect ratio of the solid graphite particles is 1 or more and 5 or less, and a negative electrode utilization factor that is the proportion of the amount of charge per mass of the negative active material in a full charge state to a theoretical capacity per mass of graphite is 0.65 or more.

4 Claims, 2 Drawing Sheets

(58) Field of Classification Search
CPC ........... H01M 2220/20; H01M 50/103; H01M 10/052; H01G 11/30; H01G 11/32; H01G 11/42; H01G 11/48; H01G 11/06; Y02E 60/10
See application file for complete search history.

(56) References Cited

U.S. PATENT DOCUMENTS

| | | | | |
|---|---|---|---|---|
| 11,043,672 | B2 * | 6/2021 | Adachi | H01M 4/5835 |
| 2004/0219431 | A1 | 11/2004 | Ozaki et al. | |
| 2004/0234856 | A1 | 11/2004 | Morigaki et al. | |
| 2007/0275302 | A1 | 11/2007 | Sotowa et al. | |
| 2008/0118837 | A1 | 5/2008 | Shirane et al. | |
| 2011/0193014 | A1 | 8/2011 | Sotowa et al. | |
| 2013/0323601 | A1 | 12/2013 | Nishimura et al. | |
| 2014/0141305 | A1 | 5/2014 | Muraoka et al. | |
| 2016/0336592 | A1 | 11/2016 | Hirose et al. | |
| 2019/0237763 | A1 | 8/2019 | Wakizaka et al. | |
| 2019/0280337 | A1 * | 9/2019 | Narita | H01M 50/178 |
| 2020/0227746 | A1 | 7/2020 | Wang et al. | |
| 2021/0257618 | A1 * | 8/2021 | Ogi | H01M 50/578 |
| 2023/0100420 | A1 * | 3/2023 | Kawaguchi | H01G 11/64 429/209 |
| 2024/0322119 | A1 * | 9/2024 | Oyama | H01M 4/587 |
| 2025/0006916 | A1 * | 1/2025 | Uehira | H01M 4/364 |
| 2025/0385259 | A1 * | 12/2025 | Sekiguchi | H01G 11/24 |

FOREIGN PATENT DOCUMENTS

| | | | | | |
|---|---|---|---|---|---|
| JP | 2005011801 | A | | 1/2005 | |
| JP | 2005032593 | A | | 2/2005 | |
| JP | 2005222933 | A | | 8/2005 | |
| JP | 2006294469 | A | | 10/2006 | |
| JP | 2007095402 | A | | 4/2007 | |
| JP | 2007191369 | A | | 8/2007 | |
| JP | 2009245866 | A | | 10/2009 | |
| JP | 2011091054 | A | | 5/2011 | |
| JP | 2013008585 | A | * | 1/2013 | |
| JP | 2014524636 | A | * | 9/2014 | |
| JP | 2015165482 | A | | 9/2015 | |
| JP | 2016201310 | A | | 12/2016 | |
| KR | 20010080071 | A | * | 8/2001 | |
| WO | 2012144618 | A1 | | 10/2012 | |
| WO | 2013014827 | A1 | | 1/2013 | |
| WO | 2015005294 | A1 | | 1/2015 | |
| WO | 2017221895 | A1 | | 12/2017 | |
| WO | 2019031543 | A1 | | 2/2019 | |
| WO | WO-2020054708 | A1 | * | 3/2020 | H01G 11/18 |

OTHER PUBLICATIONS

JP_2013008585_A_ Original File and Translation (Year: 2013).*
JP_2014524636_A Original File and Translation (Year: 2014).*
KR_20010080071_A Original File and Translation (Year: 2001).*
CN_108140851_A Original File and Translation (Year: 2018).*
JP_2007191369_A Translation (Year: 2007).*
International Search Report (ISR) dated Jun. 8, 2021 filed in PCT/JP2021/009403.

* cited by examiner

ENERGY STORAGE DEVICE

TECHNICAL FIELD

The present invention relates to an energy storage device.

BACKGROUND ART

Nonaqueous electrolyte secondary batteries typified by lithium ion nonaqueous electrolyte secondary batteries are widely in use for electronic equipment such as personal computers and communication terminals, automobiles, and the like because the batteries have high energy density. The nonaqueous electrolyte secondary battery is generally provided with an electrode assembly with a pair of electrodes electrically isolated by a separator, and a nonaqueous electrolyte interposed between the electrodes and is configured to be charged and discharged by transferring ions between both the electrodes. Capacitors such as lithium ion capacitors and electric double-layer capacitors are also widely in use as energy storage devices except for the nonaqueous electrolyte secondary batteries.

For purposes such as improving the energy density of the energy storage device, a carbon material such as graphite has been used as the negative active material of the energy storage device (cf. Patent Document 1).

PRIOR ART DOCUMENT

Patent Document

Patent Document 1: JP-A-2005-222933

SUMMARY OF THE INVENTION

Problems to be Solved by the Invention

In the case of, however, using graphite is used for the negative active material for the purpose of increasing the capacity and energy density of the energy storage device, and increasing the negative electrode utilization factor, which is the proportion of the amount of charge per mass of the negative active material in the full charge state of the energy storage device to the theoretical capacity per mass of graphite, there is a possibility that the capacity retention ratio after a charge-discharge cycle at a high rate may be significantly decreased.

The present invention has been made based on the foregoing circumstances, and an object of the present invention is to provide an energy storage device capable of keeping the capacity retention ratio after a charge-discharge cycle at a high rate from being decreased in the case of using graphite as a negative active material and increasing the negative electrode utilization factor in the full charge state of the energy storage device.

Means for Solving the Problems

An energy storage device according to an aspect of the present invention made for solving the problem mentioned above includes a negative electrode and a positive electrode, the negative electrode includes a negative substrate and a negative active material layer directly or indirectly layered on the negative substrate, the negative active material layer contains a negative active material, the negative active material contains solid graphite particles as a main component, the aspect ratio of the solid graphite particles is 1 or more and 5 or less, and a negative electrode utilization factor that is the proportion of the amount of charge per mass of the negative active material in a full charge state to a theoretical capacity per mass of graphite is 0.65 or more.

Advantages of the Invention

According to the present invention, it is possible to provide an energy storage device capable of keeping the capacity retention ratio after a charge-discharge cycle at a high rate from being decreased in the case of using graphite as a negative active material and increasing the negative electrode utilization factor in the full charge state of the energy storage device.

MODE FOR CARRYING OUT THE INVENTION

Figure 1:
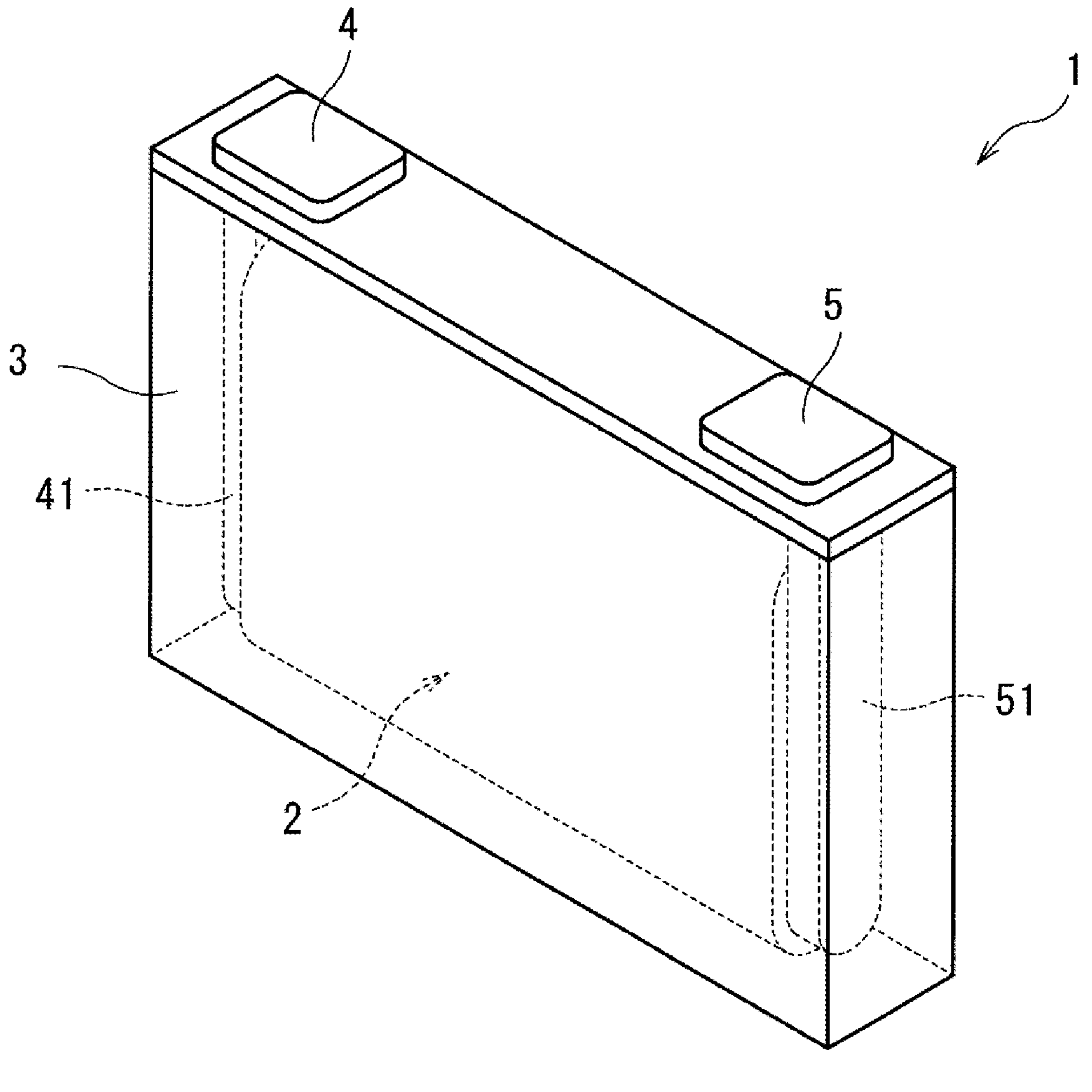
FIG. 1 is an external perspective view illustrating an embodiment of an energy storage device.

An energy storage device according to an embodiment of the present invention includes a negative electrode and a positive electrode, the negative electrode includes a negative substrate and a negative active material layer directly or indirectly layered on the negative substrate, the negative active material layer contains a negative active material, the negative active material contains solid graphite particles as a main component, the aspect ratio of the solid graphite particles is 1 or more and 5 or less, and a negative electrode utilization factor that is the proportion of the amount of charge per mass of the negative active material in a full charge state to a theoretical capacity per mass of graphite is 0.65 or more.

For the energy storage device, the capacity retention ratio after a charge-discharge cycle at a high rate can be kept from being decreased in the case of using graphite as the negative active material and increasing the negative electrode utilization factor in the full charge state of the energy storage device. Although the reason for this is not clear, the following reason is presumed.

More specifically, in a battery designed to have a high negative electrode utilization factor, such as a battery with a negative electrode utilization factor of 0.65 or more, the implementation of a charge-discharge cycle at a high rate with the use of graphite for a negative active material has the possibility of causing a significant decrease in capacity retention ratio. In particular, when a charge-discharge cycle at a high rate is implemented with the use of the negative active material that has a hollow structure, the space in the graphite particles causes the negative electrode to have an inhomogeneous current distribution in the charge-discharge cycle, thereby causing a newly generated surface to be exposed due to local expansions and contractions, and increasing the decrease in capacity retention ratio. In addition, when the graphite is high in aspect ratio, that is, when a charge-discharge cycle at a high rate is implemented with the use of flat plate-shaped graphite, because the graphite particles are highly oriented, the directions of higher expansions and the directions of lower expansions are generated in the negative electrode, thereby making the amount of expansion inhomogeneous. In the directions of higher expansions, the newly generated surface is likely to be exposed, and the decrease in capacity retention ratio is increased.

In contrast, for the energy storage device, solid graphite particles that are solid and 1 or more and 5 or less in aspect ratio is used as a main component for the negative active material, thereby allowing the negative electrode to be prevented from having an inhomogeneous current distribution in the charge-discharge cycle, and also allowing the inhomogeneous amount of expansion to be prevented. As a result, the energy storage device is capable of suppressing the decrease in capacity retention ratio after a charge-discharge cycle at a high rate.

In this regard, the "main component in the negative active material" refers to a component having the highest content, and refers to a component contained in an amount of 50% by mass or more with respect to the total mass of the negative active material. The "aspect ratio" means the A/B value that is the ratio of the longest diameter A of the particle to the longest diameter B in the direction perpendicular to the diameter A in the cross section of the particle observed in the SEM image by the scanning electron microscope. In addition, the "fully charge state" refers to a state where the energy storage device is charged with electricity until reaching a rated upper limit voltage for securing a rated capacity determined in advance by design (typically, a state where the energy storage device is charged with electricity until the SOC (State of Charge) reaches 100%). When the rated capacity is not described, the "full charge state" refers to a state where the energy storage device is charged with electricity using a charge control device adopted by the energy storage device, and the energy storage device is charged with electricity until reaching an end-of-charge voltage when the charge operation is controlled to be stopped. For example, a state where the energy storage device is subjected to constant current charge with a current of ⅓ C until reaching the rated upper limit voltage or the end-of-charge voltage, and then subjected to constant voltage charge (CV) charge until the current reaches 0.01 C with the rated upper limit voltage or the end-of-charge voltage is a typical example of the "full charge state" referred to herein. Accordingly, "the amount of charge per mass of the negative active material in the full charge state" refers to an amount of charge stored in the negative active material per unit mass in a state where the energy storage device is charged until the rated upper limit voltage or the end-of-charge voltage is reached, which is a different concept from "the actual charge capacity per mass of the negative active material" that means the maximum chargeable capacity that can be actually stored by the negative active material reversibly (without destroying the structure of the active material). The amount of charge per mass of the negative active material in the full charge state can be arbitrarily set depending on the aspect in which the energy storage device is used, and the like, and is typically set to a value that is smaller than the actual charge capacity per mass of the negative active material. The "theoretical capacity" refers to the maximum amount of electricity that can be theoretically stored based on the Faraday's law by an active material per unit mass in an assumed electrochemical reaction. For example, when the negative active material is graphite, the theoretical capacity per mass of graphite is 372 mAh/g.

The negative electrode utilization factor is preferably 0.80 or more and 0.90 or less. The negative electrode utilization factor falls within the range mentioned above, thereby making it possible to achieve, at a higher level, a balance between: the high capacity and increased energy density of the energy storage device; and the effect of suppressing the decrease in charge-discharge cycle retention ratio at a higher rate.

The solid graphite particles have an average particle size of 5 μm or less. The average particle size of the solid graphite particles falls within the range mentioned above, thereby allowing the energy storage device to suppress the decrease in capacity retention ratio after a charge-discharge cycle at a higher rate. In this regard, the "average particle size" means a value (median diameter: D50) at which the volume-based integrated distribution calculated in accordance with JIS-Z-8819-2 (2001) becomes 50%.

Hereinafter, an energy storage device according to an embodiment of the present invention will be described in detail with reference to the drawings.

<Energy Storage Device>

An energy storage device according to an embodiment of the present invention includes a negative electrode, a positive electrode, a separator interposed between the positive electrode and the negative electrode, and a nonaqueous electrolyte. Hereinafter, a nonaqueous electrolyte secondary battery will be described as a preferable example of the energy storage device. The positive electrode and the negative electrode usually form an electrode assembly in which the positive electrode and the negative electrode are alternately superposed by being stacked or wound with a separator interposed therebetween. The electrode assembly is housed in a battery case, and the battery case is filled with the nonaqueous electrolyte.

[Negative Electrode]

The negative electrode includes a negative substrate and a negative active material layer stacked directly or indirectly on at least one surface of the negative substrate. The negative active material layer contains a negative active material. The negative electrode may include an intermediate layer disposed between the negative substrate and the negative active material layer.

(Negative Substrate)

The negative substrate is a substrate having conductivity. As the material of the negative substrate, a metal such as copper, nickel, stainless steel, or a nickel-plated steel or an alloy thereof is used, and copper or a copper alloy is preferable. Examples of the form of the negative substrate include a foil, and a vapor deposition film, and a foil is preferred from the viewpoint of cost. More specifically, the negative substrate is preferably a copper foil. Examples of the copper foil include rolled copper foil, electrolytic copper foil, and the like. Note that having "conductivity" means that the volume resistivity measured in accordance with JIS-H-0505 (1975) is $1\times10^7$ Ω·cm or less, and "non-conductive" means that the volume resistivity is more than $1\times10^7$ Ω·cm.

The average thickness of the negative substrate is preferably 2 μm or more and 35 μm or less, more preferably 3 μm or more and 25 μm or less, still more preferably 4 μm or more and 20 μm or less, particularly preferably 5 μm or more and 15 μm or less. When the average thickness of the negative substrate falls within the above-described range, it is possible to increase the energy density per volume of the energy storage device while increasing the strength of the negative substrate. The "average thickness of a substrate" refers to a value obtained by dividing the cutout mass in cutout of a substrate having a predetermined area by the average particle size and cutout area of the substrate.

(Negative Active Material Layer)

The negative active material layer contains a negative active material.

The negative active material contains solid graphite particles as a main component. The negative active material contains the solid graphite particles as a main component, thereby allowing the capacity of the energy storage device to be increased. In addition, the negative active material may contain other negative active materials except for the solid graphite p articles.

In this specification, the "graphite" is a carbon substance in which the average grid spacing d(002) of a (002) plane, measured by an X-ray diffraction method before charge-discharge or in a discharged state, is less than 0.34 nm. In addition, the term "solid" means that the inside of the particle is filled substantially without voids. More specifically, being "solid" means that in a cross section of a particle observed in a SEM image acquired by a scanning electron microscope (SEM), the area ratio excluding voids in the particle relative to the total area of the particle is 95% or more. In one preferred aspect, the area ratio of the solid graphite particles can be 97% or more (e.g. 99% or more). The "discharged state" herein refers to a state where an open circuit voltage is 0.7 V or more in a unipolar battery using a negative electrode, containing a carbon material as a negative active material, as a working electrode and using metallic Li as a counter electrode. Since the potential of the metallic Li counter electrode in an open circuit state is substantially equal to an oxidation/reduction potential of Li, the open circuit voltage in the unipolar battery is substantially equal to the potential of the negative electrode containing the carbon material with respect to the oxidation/reduction potential of Li. That is, the fact that the open circuit voltage in the unipolar battery is 0.7 V or more means that lithium ions that can be occluded and released in association with charge-discharge are sufficiently released from the carbon material that is the negative active material.

The area ratio R of the graphite particle excluding voids in the particle relative to the total area of the particle can be determined in accordance with the following procedure.

(1) Preparation of Samples for Measurement

The powder of the graphite particles to be measured is fixed with a thermosetting resin. A cross-section polisher is used to expose the cross section of the graphite particles fixed with resin to produce a sample for measurement.

(2) Acquisition of SEM Image

For acquiring the SEM image, JSM-7001F (manufactured by JEOL Ltd.) is used as a scanning electron microscope. As the SEM image, a secondary electron image is observed. The acceleration voltage is 15 kV. The observation magnification is set such that the number of graphite particles appearing in one field of view is 3 or more and 15 or less. The obtained SEM image is stored as an image file. In addition, various conditions such as spot diameter, working distance, irradiation current, luminance, and focus are appropriately set so as to make the contour of the graphite particle clear.

(3) Cut-Out of Contour of Graphite Particle

The contour of the graphite particle is cut out from the acquired SEM image by using an image cutting function of an image editing software Adobe Photoshop Elements 11. The contour is cut out by using a quick selection tool to select the outside of the contour of the active material particle and edit a portion except for the graphite particle to a black background. At this time, when the number of the graphite particles from which the contours have been able to be cut out is less than three, the SEM image is acquired again, and the cutout is performed until the number of the graphite particles from which the contours have been able to be cut out becomes three or more.

(4) Binarization Processing

The image of the first graphite particle among the cut-out graphite particles is binarized with the use of image analysis software PopImaging 6.00 to set, as a threshold value, a concentration 20% lower than a concentration at which the intensity reaches the maximum inside the contour of the particle (within the particle). By the binarization processing, an area on the low-concentration side is calculated to obtain "an area S1 excluding voids in the particles".

Next, the image of the first graphite particle is binarized using a concentration 10 as a threshold value. The outer edge of the graphite particle is determined by the binarization processing, and the area inside the outer edge is calculated to obtain an "area S0 of the whole particle".

By calculating S1 relative to S0 (that is, S1/S0) by using S1 and S0 calculated above, "an area ratio R1 excluding voids in the particles relative to the area of the entire particle" in the first graphite particle is calculated.

The images of the second and subsequent graphite particles among the cut-out graphite particles are also subjected to the binarization processing described above, and the areas S1 and S0 are calculated. Based on the calculated areas S1, S0, area ratios R2, R3, . . . of the respective graphite particles are calculated.

(5) Determination of Area Ratio R

By calculating the average value of all the area ratios R1, R2, R3, . . . calculated by the binarization processing, "the area ratio R of the graphite particles excluding voids in the particles relative to the total area of the particles" is determined.

As the solid graphite particles, particles that have appropriate aspect ratio and shape can be appropriately selected from various known graphite particles, and then used. Examples of the known graphite particles include artificial graphite particles and natural graphite particles. In this regard, the artificial graphite is a generic term for artificially produced graphite, and the natural graphite is a generic term for graphite which can be taken from natural minerals. Specific examples of the natural graphite particles include particles of scale-like graphite, massive graphite (flake graphite), and earthy graphite. The solid graphite particles may be flat natural graphite particles having a scale-like shape or spheroidized natural graphite particles obtained by spheroidizing the scale-like graphite. In a preferred aspect, the solid graphite particles are artificial graphite particles. The use of solid artificial graphite particles more effectively achieves the above-described effect. The solid graphite particles may be graphite particles, the surfaces of which are coated (for example, with amorphous carbon coat).

The lower limit of the aspect ratio of the solid graphite particles is 1 (for example, 1.5), preferably 2.0. In some aspects, the aspect ratio of the solid graphite particles may be 2.2 or more (for example, 2.5 or more). In some aspects, the aspect ratio of the solid graphite particle may be 2.3 or more (e.g. 2.5 or more, e.g. 2.7 or more). In contrast, the upper limit of the aspect ratio of the solid graphite particles is 5 (for example, 4.5), preferably 4.2 from viewpoints such as more effectively suppressing the decrease in the capacity retention ratio after a charge-discharge cycle at a high rate. In some aspects, the aspect ratio of the solid graphite particles may be 3.5 or less (for example, 3.2 or less). By setting the aspect ratio of the solid graphite particles within the above range, the graphite particles are close to spherical shape, and current concentration is less likely to be caused, thus allowing the negative electrode to be prevented from being unevenly expanded.

The aspect ratio can be determined as follows.

(1) Preparation of Samples for Measurement

A sample for measurement having an exposed cross section used for determining the area ratio R described above is used.

(2) Acquisition of SEM Image

For acquiring the SEM image, JSM-7001F (manufactured by JEOL Ltd.) is used as a scanning electron microscope. As the SEM image, a secondary electron image is observed. The acceleration voltage is 15 kV. The observation magnification is set so that the number of negative active material particles appearing in one field of view is 100 or more and 1000 or less. The obtained SEM image is stored as an image file. In addition, various conditions such as spot diameter, working distance, irradiation current, luminance, and focus are appropriately set so as to make the contour of the negative active material particle clear.

(3) Determination of Aspect Ratio

From the acquired SEM image, hundred negative active material particles are randomly selected, and for each of the particles, the longest diameter A of the negative active material particle and the longest diameter B in the direction perpendicular to the diameter A are measured to calculate the A/B value. The average value of all the calculated A/B values is calculated to determine the aspect ratio of the negative active material particles.

The lower limit of the average particle size of the solid graphite particles is preferably 0.5 μm, more preferably 1 μm (for example, 1.5 μm). In some aspects, the average particle size of the solid graphite particles may be 2 μm or more, or 2.5 μm or more. The upper limit of the average particle size is preferably 10 μm (for example, 8 μm), more preferably 5 μm, still more preferably 4.8 μm from viewpoints such as better suppressing capacity degradation at a high rate. In some aspects, the average particle size of the solid graphite particles may be 4 μm or less, or 3.5 μm or less (for example, 3 μm or less). The average particle size of the solid graphite particles falls within the range mentioned above, thereby allowing the energy storage device to suppress the decrease in capacity retention ratio after a charge-discharge cycle at a higher rate. The technique disclosed herein can be preferably carried out in an aspect in which the average particle size of the solid graphite particles is 1 μm or more and less than 8 μm (or 2 μm or more and 5 μm or less, particularly 2 μm or more and 3.5 μm or less).

Suitable examples of the solid graphite particles disclosed herein include solid graphite particles with an aspect ratio of 1 or more and 5 or less and a median diameter of 10 μm or less; solid graphite particles with an aspect ratio of 1.2 or more and 4.5 or less and a median diameter of 5 μm or less; solid graphite particles with an aspect ratio of 1.3 or more and 4.2 or less and a median diameter of 4.5 μm or less; solid graphite particles with an aspect ratio of 1.5 or more and 3.5 or less and a median diameter of 3.5 μm or less; solid graphite particles with an aspect ratio of 2 or more and 3.5 or less and a median diameter of 3.5 μm or less; and solid graphite particles with an aspect ratio of 2.5 or more and 3.2 or less and a median diameter of 3 μm or less. The use of such solid graphite particles that are small in size and close to a spherical shape can achieve above-described effect more effectively.

The median diameter (D50) for "average particle size" mentioned above can be specifically the value measured by the following method. A laser diffraction type particle size distribution measuring apparatus ("SALD-2200" manufactured by Shimadzu Corporation) is used as a measuring apparatus, and Wing SALD II is used as measurement control software. A scattering measurement mode is employed, and a wet cell, in which a dispersion liquid with a measurement sample dispersed in a dispersion solvent circulates, is irradiated with a laser beam to obtain a scattered light distribution from the measurement sample. The scattered light distribution is approximated by a log-normal distribution, and a particle size corresponding to an accumulation degree of 50% is defined as a median diameter (D50).

The graphitization degree $P_1$ of the solid graphite particles is not particularly limited, but can be generally less than 0.9 (for example, 0.5 or more and less than 0.9). The "graphitization degree $P_1$" herein is calculated from $d(002)=3.35P_1+3.44(1-P_1)$ with the use of the average grid spacing d(002) of a (002) plane of graphite, measured by an X-ray diffraction method before charge-discharge or in a discharged state. The graphitization degree $P_1$ of the solid graphite particles is, for example, 0.65 or more and 0.95 or less, and typically 0.7 or more and 0.90 or less. The use of solid graphite particle with such a graphitization degree $P_1$ can achieve the above-described effect more effectively. The BET specific surface area of the solid graphite particle is not particularly limited, but is, for example, 3 $m^2/g$ or more. By using the solid graphite particle with a large BET specific surface area as described above, the above-described effect can be more effectively exhibited. The BET specific surface area of the solid graphite particle is preferably 3.2 $m^2/g$ or more, more preferably 3.5 $m^2/g$ or more, still more preferably 3.7 $m^2/g$ or more. The upper limit of the BET specific surface area of the solid graphite particle is, for example, 10 $m^2/g$. The BET specific surface area of the solid graphite particle is preferably 8 $m^2/g$ or less, more preferably 6 $m^2/g$ or less, still more preferably 5 $m^2/g$ or less. The BET specific surface area of the solid graphite particle is grasped by pore size distribution measurement by one-point method using nitrogen gas adsorption.

The R value of the solid graphite particles is not particularly limited, and can be generally 0.25 or more (for example, 0.25 or more and 0.8 or less). The "R value" herein is the ratio of the peak intensity ($I_{D1}$) of the D band to the peak intensity ($I_{G1}$) of the G band ($I_{D1}/I_{G1}$) in the Raman spectrum. The R value of the solid graphite particles is, for example, 0.28 or more (e.g. 0.28 or more and 0.7 or less), typically 0.3 or more (e.g. 0.3 or more and 0.6 or less). In some aspects, the R value of the solid graphite particles may be 0.5 or less, or 0.4 or less.

The "Raman spectrum" herein is obtained by performing Raman spectrometry in the range from 200 $cm^{-1}$ to 4000 $cm^{-1}$ under the conditions of a wavelength of 532 nm (YAG laser), a grating of 600 g/mm, and a measurement magnification of 100 times with the use of "HR Revolution" manufactured by HORIBA, Ltd. In addition, "the peak intensity ($I_{G1}$) of the G band" and "the peak intensity ($I_{D1}$) of the D band" can be determined by the following method. First, the obtained Raman spectrum is normalized by the maximum intensity (e.g. the intensity of the G band) in the measurement range with the intensity of the spectrum at 4000 $cm^{-1}$ as a base intensity. Next, the obtained spectrum is subjected to fitting with the use of a Lorentz function, and the respective intensities of the G band near 1580 $cm^{-1}$ and the D band near 1350 $cm^{-1}$ are calculated as "peak intensity of G band ($I_G$O" and "peak intensity of D band ($I_{D1}$)".

The lower limit of the content of the solid graphite particles relative to the total mass of the negative active material is preferably 60 mass % and more preferably 70 mass %. In some aspects, the content of the solid graphite particles with respect to the total mass of the negative active material may be, for example, 80% by mass or more, or may be 90% by mass. By setting the content of the solid graphite particles to be equal to or more than the above lower limit, the capacity retention ratio of the energy storage device after a charge-discharge cycle at a high rate can be further increased. On the other hand, the upper limit of the content of the solid graphite particles relative to the total mass of the negative active material may be, for example, 100 mass %.

(Other Negative Active Materials)

The negative active material layer disclosed herein may contain carbonaceous active materials other than the solid graphite particles mentioned above as long as the effect of the present invention is not impaired. Examples of such carbonaceous active materials other than the solid graphite particles include hollow graphite particles and non-graphitic carbon particles. Examples of the non-graphitic carbon particles include hardly graphitizable carbon and easily graphitizable carbon. The term "hardly graphitizable carbon" herein refers to a carbon material in which the average grid distance of the (002) plane d(002) determined by the X-ray diffraction method before charge-discharge or in the discharged state is 0.36 nm or more and 0.42 nm or less. The "easily graphitizable carbon" refers to a carbon material in which the d(002) is 0.34 nm or more and less than 0.36 nm. In the case of containing a carbonaceous active material other than the solid graphite particles mentioned above, the mass of the solid graphite particles is normally 50% by mass or more, preferably 70% by mass or more, more preferably 80% by mass or more, of the total mass of the carbonaceous active material contained in the negative active material layer. In particular, an energy storage device is preferable in which the solid graphite particles constitute 90% by mass of the carbonaceous active material contained in the negative active material layer.

The negative active material layer mentioned above may contain a negative active material (hereinafter, referred to as a non-carbonaceous active material) formed of a material other than the carbonaceous active material as long as the effects of the present invention are not impaired. Examples of the non-carbonaceous active material include semimetals such as Si, metals such as Sn, oxides thereof, or composites of any of these metals and carbon materials. The content of the non-carbonaceous active material is normally, for example, 50 mass % or less, preferably 30 mass % or less, more preferably 10 mass % or less, of the total mass of the negative active material contained in the negative active material layer.

The content of the negative active material in the negative active material layer is not particularly limited, but the lower limit thereof is preferably 50% by mass, more preferably 80% by mass, still more preferably 90% by mass. Meanwhile, the upper limit of the content is preferably 99% by mass, and more preferably 98% by mass.

(Other Optional Components)

The negative active material layer contains optional components such as a conductive agent, a thickener, and a filler, if necessary.

The solid graphite particles also have conductivity, but the conductive agent is not particularly limited as long as it is a conductive material. Examples of such a conductive agent include graphite other than the solid graphite particles, carbonaceous materials, metals, and conductive ceramics. Examples of the carbonaceous materials include non-graphitized carbon and graphene-based carbon. Examples of the non-graphitized carbon include carbon nanofibers, pitch-based carbon fibers, and carbon black. Examples of the carbon black include furnace black, acetylene black, and ketjen black. Examples of the graphene-based carbon include graphene, carbon nanotubes (CNTs), and fullerene. Examples of the shape of the conductive agent include a powdery shape and a fibrous shape. As the conductive agent, one of these materials may be used singly or two or more thereof may be used in mixture. These materials may be composited and used. For example, a material obtained by compositing carbon black with CNT may be used. Among them, carbon black is preferable from the viewpoint of electron conductivity and coatability, and in particular, acetylene black is preferable.

Examples of the binder include: thermoplastic resins such as a fluororesin (polytetrafluoroethylene (PTFE), polyvinylidene fluoride (PVDF), etc.), a polyethylene, a polypropylene, a polyacrylic acid, and a polyimide; elastomers such as an ethylene-propylene-diene rubber (EPDM), sulfonated EPDM, a styrene-butadiene rubber (SBR), and a fluororubber; and polysaccharide polymers.

The content of the binder in the negative composite layer is preferably 1% by mass or more and 10% by mass or less, and more preferably 3% by mass or more and 9% by mass or less. When the content of the binder is within the above-described range, the negative active material particles can be stably held.

Examples of the thickener include polysaccharide polymers such as carboxymethylcellulose (CMC) and methylcellulose. When the thickener has a functional group that is reactive with lithium and the like, the functional group may be deactivated by methylation or the like in advance. When a thickener is used, the ratio of the thickener to the entire negative composite layer can be about 8% by mass or less, and is preferably usually about 5.0% by mass or less (for example, 1.0% by mass or less).

The filler is not particularly limited. Examples of the main component of the filler include polyolefins such as polypropylene and polyethylene, inorganic oxides such as silicon dioxide, aluminum oxide, titanium dioxide, calcium oxide, strontium oxide, barium oxide, magnesium oxide and aluminosilicate, hydroxides such as magnesium hydroxide, calcium hydroxide and aluminum hydroxide, carbonates such as calcium carbonate, hardly soluble ionic crystals such as calcium fluoride, barium fluoride, and barium sulfate and the like, nitrides such as aluminum nitride and silicon nitride, and substances derived from mineral resources, such as talc, montmorillonite, boehmite, zeolite, apatite, kaolin, mullite, spinel, olivine, sericite, bentonite and mica, and artificial products thereof. When a filler is used in the negative composite layer, the ratio of the filler in the entire negative composite layer can be about 8.0% by mass or less, and is usually preferably about 5.0% by mass or less (for example, 1.0% by mass or less).

The lower limit of the negative electrode utilization factor is 0.65, preferably 0.80, more preferably 0.85. The upper limit of the negative electrode utilization factor is preferably 0.90, more preferably 0.88. The negative electrode utilization factor falls within the range mentioned above, thereby making it possible to achieve, at a higher level, a balance between: the high capacity and increased energy density of the energy storage device; and the effect of suppressing the decrease in capacity retention ratio after a charge-discharge cycle at a high rate. As described above, the negative electrode utilization factor refers to the proportion of an amount of charge per mass of the negative active material in a full charge state to a theoretical capacity per mass of graphite.

The amount of charge per mass of the negative active material in the full charge state is measured by the following procedure.

(1) The target battery was discharged to a discharge state (low SOC region), and then disassembled in a glove box.

(2) In the glove box controlled to an atmosphere having an oxygen concentration of 5 ppm or less, and the positive electrode and the negative electrode plate are taken out to assemble a small-sized laminate cell.

(3) After the small-sized laminate cell is charged with electricity to the full charge state, constant current constant voltage (CCCV) discharge is performed up to 0.01 C at the lower limit voltage at which the rated capacity is obtained by the energy storage device.

(4) In the glove box controlled to an atmosphere having an oxygen concentration of 5 ppm or less, the small-sized laminate cell is disassembled. The negative electrode is taken out, and a small-sized laminate cell in which lithium metal is disposed as a counter electrode is reassembled.

(5) Additional discharge is performed at a current density of 0.01 C until the negative electrode potential reaches 2.0 V (vs. $Li/Li^+$) to adjust the negative electrode to a fully discharged state.

(6) The total amount of electricity in the above (3) and (5) is divided by the mass of the negative active material of a positive-negative electrode facing portion in the small-sized laminate cell to obtain an amount of charge per mass.

(Intermediate Layer)

The intermediate layer is a coating layer on the surface of the negative substrate, and contains conductive particles such as carbon particles to reduce contact resistance between the substrate and the composite layer. The configuration of the intermediate layer is not particularly limited, and the intermediate layer can be formed of, for example, a composition containing a resin binder and conductive particles.

[Positive Electrode]

The positive electrode includes a positive substrate and a positive composite layer layered directly or indirectly on at least one surface of the positive substrate. The positive composite layer contains a positive active material. The positive electrode may include an intermediate layer disposed between the positive substrate and the positive composite layer.

(Positive Substrate)

The positive substrate is a substrate with conductivity. As the material of the positive substrate, a metal such as aluminum, titanium, tantalum or stainless steel, or an alloy thereof is used. Among these materials, aluminum and aluminum alloys are preferable from the viewpoint of the balance among electric potential resistance, high conductivity, and cost. Examples of the form of the positive substrate include a foil and a vapor deposited film, and a foil is preferable from the viewpoint of cost. More specifically, an aluminum foil is preferable as the positive substrate. Examples of the aluminum or aluminum alloy include A1085 and A3003 prescribed in JIS-114000 (2014).

(Positive Composite Layer)

The positive composite layer is formed of a so-called positive composite containing a positive active material. The positive active material can be appropriately selected from, for example, known positive active materials. As the positive active material for a lithium ion nonaqueous electrolyte secondary battery, a material capable of storing and releasing lithium ions is typically used. Examples of the positive active material include lithium-transition metal composite oxides having an $\alpha$-$NaFeO_2$-type crystal structure, lithium-transition metal oxides having a spinel-type crystal structure, polyanion compounds, chalcogenides, and sulfur. Examples of the lithium transition metal composite oxide having an $\alpha$-$NaFeO_2$ type crystal structure include $Li[Li_xNi_{1-x}]O_2$ ($0 \le x < 0.5$), $Li[Li_xNi_\gamma Co_{(1-x-\gamma)}]O_2$ ($0 \le x < 0.5$, $0 < \gamma < 1$), $Li[Li_xCo_{(1-x)}]O_2$ ($0 \le x < 0.5$), $Li[Li_xNi_\gamma Mn_{(1-x-\gamma)}]O_2$ ($0 \le x < 0.5$, $0 < \gamma < 1$), $Li[Li_xNi_\gamma Mn_\beta Co_{(1-x-\gamma-\beta)}]O_2$ ($0 \le x < 0.5$, $0 < \gamma$, $0 < \beta$, $0.5 < \gamma+\beta < 1$), and $Li[Li_xNi_\gamma Co_\beta Al_{(1-x-\gamma-\beta)}]O_2$ ($0 \le x < 0.5$, $0 < \gamma$, $0 < \beta$, $0.5 < \gamma+\beta < 1$). Examples of the lithium-transition metal composite oxides having a spinel-type crystal structure include $Li_xMn_2O_4$ and $Li_xNi_\gamma Mn_{(2-\gamma)}O_4$. Examples of the polyanion compounds include $LiFePO_4$ (LFP), $LiMnPO_4$, $LiNiPO_4$, $LiCoPO_4$, $Li_3V_2(PO_4)_3$, $Li_2MnSiO_4$, and $Li_2CoPO_4F$. Examples of the chalcogenides include titanium disulfide, molybdenum disulfide, and molybdenum dioxide. Some of atoms or polyanions in these materials may be substituted with atoms or anion species composed of other elements. The surfaces of these materials may be coated with other materials.

Among the positive active materials mentioned above, the polyanion compounds (for example, a lithium iron phosphate) having an olivine-type crystal structure, represented by $Li_xFe_{1-z}M_z(PO_4)_y$ ($0.85 \le x \le 1.10$, $0.95 \le y \le 1.05$, $0 \le z \le 0.5$, M is a metal other than Li and Fe), are preferable. In the polyanion compounds represented by $Li_xFe_{1-z}M_z(PO_4)_y$, x is preferably 0.9 or more, and may be 1. z is preferably 0.3 or less, and may be 0.1 or less. M is not particularly limited as long as M is a metal other than Li and Fe, but Co, Al, Cr, Mg, Mn, Ni, and Ti are preferable, and Mn is particularly preferable. In addition, $PO_4$ may be partially substituted with another anion such as $BO_3$, $SiO_4$, $WO_4$, or $MoO_4$. In an energy storage device containing the polyanion compound as a positive active material, film growth on a negative electrode may be a main factor for a decrease in capacity after a charge-discharge cycle at a high rate. In the energy storage device, the negative active material has the configuration mentioned above, thereby keeping the negative active material from generating a new surface, and inhibiting film growth. Thus, in an aspect in which such a polyanion compound is used, the above-described effect can be more favorably achieved.

In the positive composite layer, one of these materials may be used singly or two or more thereof may be used in mixture. In the positive composite layer, one of these compounds may be used singly, or two or more thereof may be mixed and used.

The content of the positive active material in the positive composite layer is not particularly limited, but the lower limit thereof is preferably 50% by mass, more preferably 80% by mass, and still more preferably 90% by mass. On the other hand, the upper limit of this content is preferably 99% by mass, more preferably 98% by mass.

The amount of charge per mass of the negative electrode in the full charge state can be adjusted, for example, by changing the ratio N/P of the mass N of the negative active material per unit area in the negative active material layer to the mass P of the positive active material per unit area in the positive active material layer.

(Other Optional Components)

The positive composite contains optional components such as a conductive agent, a binder, a thickener, and a filler and the like as necessary. The optional components such as a conductive agent, a binder, a thickener, and a filler can be selected from the materials exemplified for the negative electrode.

The conductive agent is not particularly limited so long as being a conductive material. Such a conductive agent can be selected from the materials exemplified for the negative electrode. When a conductive agent is used, the ratio of the conductive agent to the entire positive composite layer can be about 1.0% by mass to 20% by mass, and is preferably usually about 2.0% by mass to 15% by mass (for example, 3.0% by mass to 6.0% by mass).

The binder can be selected from the materials exemplified for the negative electrode. When a binder is used, the ratio of the binder to the entire positive composite layer can be about 0.50% by mass to 15% by mass, and is preferably usually about 1.0% by mass to 10% by mass (for example, 1.5% by mass to 3.0% by mass).

Examples of the thickener mentioned above include polysaccharide polymers such as carboxymethylcellulose (CMC) and methylcellulose. When the thickener has a functional group that is reactive with lithium, it is preferable to deactivate this functional group by methylation and the like in advance. When a thickener is used, the ratio of the thickener to the entire positive composite layer can be about 8% by mass or less, and is preferably usually about 5.0% by mass or less (for example, 1.0% by mass or less).

The filler can be selected from the materials exemplified for the negative electrode. When a filler is used, the ratio of the filler to the entire positive composite layer can be about 8.0% by mass or less, and is preferably usually about 5.0% by mass or less (for example, 1.0% by mass or less).

(Intermediate Layer)

The intermediate layer is a covering layer on the surface of the positive substrate, and reduces contact resistance between the positive substrate and the positive composite layer by including conductive particles such as carbon particles. Similarly to the negative electrode, the configuration of the intermediate layer is not particularly limited and can be formed of, for example, a composition containing a resin binder and conductive particles.

[Nonaqueous Electrolyte]

As the nonaqueous electrolyte, a known nonaqueous electrolyte normally used for a general nonaqueous electrolyte secondary battery (energy storage device) can be used. The nonaqueous electrolyte contains a nonaqueous solvent and an electrolyte salt dissolved in the nonaqueous solvent. The nonaqueous electrolyte may be a solid electrolyte or the like.

As the nonaqueous solvent, it is possible to use a known nonaqueous solvent typically used as a nonaqueous solvent of a general nonaqueous electrolyte for an energy storage device. Examples of the nonaqueous solvent include cyclic carbonate, chain carbonate, ester, ether, amide, sulfone, lactone, and nitrile. Among these, it is preferable to use at least the cyclic carbonate or the chain carbonate, and it is more preferable use the cyclic carbonate and the chain carbonate in combination. When the cyclic carbonate and the chain carbonate are used in combination, the volume ratio of the cyclic carbonate to the chain carbonate (cyclic carbonate:chain carbonate) is not particularly limited but is preferably from 5:95 to 50:50, for example.

Examples of the cyclic carbonate include ethylene carbonate (EC), propylene carbonate (PC), butylene carbonate (BC), vinylene carbonate (VC), vinylethylene carbonate (VEC), chloroethylene carbonate, fluoroethylene carbonate (FEC), difluoroethylene carbonate (DFEC), styrene carbonate, catechol carbonate, 1-phenylvinylene carbonate, and 1,2-diphenylvinylene carbonate, and among these, EC is preferable.

Examples of the chain carbonate include diethyl carbonate (DEC), dimethyl carbonate (DMC), ethyl methyl carbonate (EMC), and diphenyl carbonate, and among these, EMC is preferable.

As the electrolyte salt, it is possible to use a known electrolyte salt typically used as an electrolyte salt of a general nonaqueous electrolyte for an energy storage device. Examples of the electrolyte salt include a lithium salt, a sodium salt, a potassium salt, a magnesium salt, and an onium salt, and a lithium salt is preferable.

Examples of the lithium salt include inorganic lithium salts such as $LiPF_6$, $LiPO_2F_2$, $LiBF_4$, $LiClO_4$, and $LiN(SO_2F)_2$, and lithium salts having a hydrocarbon group in which hydrogen is replaced by fluorine, such as $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$ and $LiC(SO_2C_2F_5)_3$. Among these salts, an inorganic lithium salt is preferable, and $LiPF_6$ is more preferable.

The lower limit of the concentration of the electrolyte salt in the nonaqueous electrolyte is preferably 0.1 mol/dm$^3$, more preferably 0.3 mol/dm$^3$, still more preferably 0.5 mol/dm$^3$, particularly preferably 0.7 mol/dm$^3$. On the other hand, the upper limit is not particularly limited, and is preferably 2.5 mol/dm$^3$, more preferably 2.0 mol/dm$^3$, still more preferably 1.5 mol/dm$^3$.

Other additives may be added to the nonaqueous electrolyte. As the nonaqueous electrolyte, a salt that is melted at normal temperature, an ionic liquid, or the like can also be used.

[Separator]

As the separator, for example, a woven fabric, a nonwoven fabric, a porous resin film, and the like are used. Among these, a porous resin film is preferable from the viewpoint of strength, and a nonwoven fabric is preferable from the viewpoint of liquid retaining property of the nonaqueous electrolyte. As a main component of the separator, for example, a polyolefin such as polyethylene or polypropylene is preferable from the viewpoint of strength, and for example, polyimide or aramid is preferable from the viewpoint of resistance to oxidative decomposition. These resins may be composited.

It is to be noted that an inorganic layer may be stacked between the separator and the electrode (usually, the positive electrode). The inorganic layer is a porous layer also called a heat resistant layer or the like. In addition, a separator with an inorganic layer formed on one or both surfaces of the porous resin film can also be used. The inorganic layer is typically composed of inorganic particles and a binder and may contain other components.

[Specific Configuration of Energy Storage Device]

The shape of the energy storage device according to the present embodiment is not particularly limited, and examples thereof include cylindrical batteries, laminated film batteries, prismatic batteries, flat batteries, coin batteries and button batteries.

Figure 2:
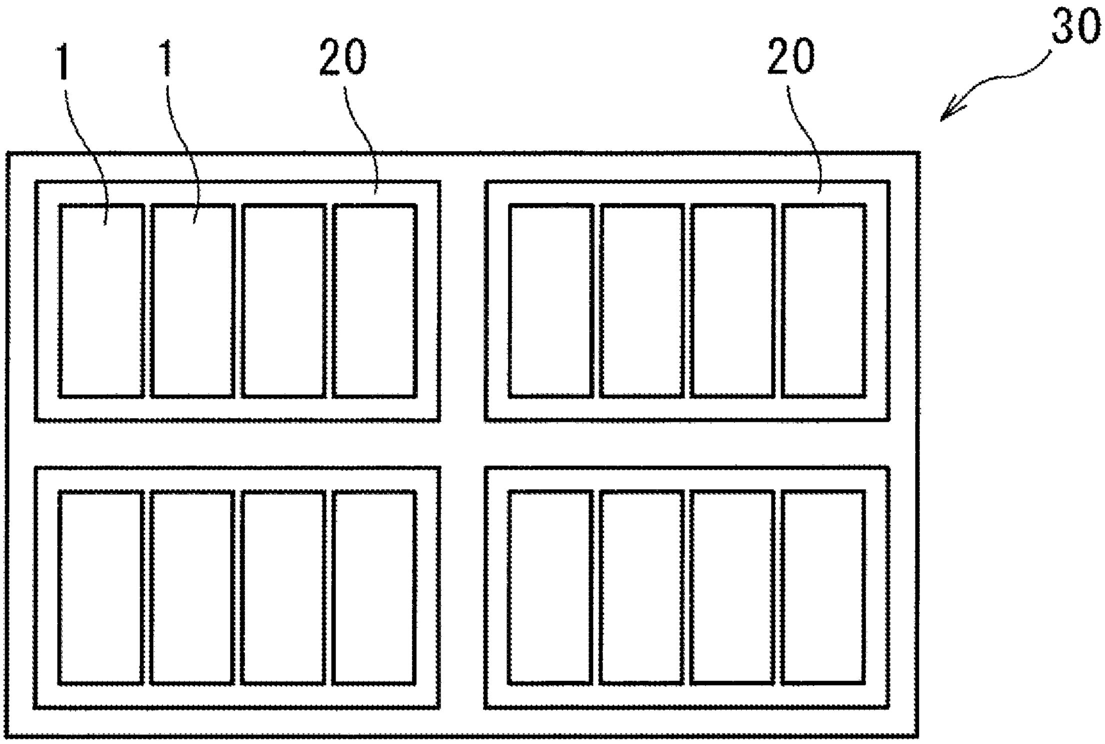
FIG. 2 is a schematic diagram showing an embodiment of an energy storage apparatus including a plurality of energy storage devices.

FIG. 1 shows a prismatic nonaqueous electrolyte secondary battery 1 as an example of the energy storage device. FIG. 2 is a view showing the inside of a battery case in a perspective manner. An electrode assembly 2 including a positive electrode and a negative electrode which are wound with a separator interposed therebetween is housed in a prismatic battery case 3. The positive electrode is electrically connected to a positive electrode terminal 4 via a positive current collector 41. The negative electrode is electrically connected to a negative electrode terminal 5 via a negative current collector 51.

[Method for Manufacturing Energy Storage Device]

A method for manufacturing the energy storage device can be appropriately selected from known methods. The manufacturing method includes, for example, fabricating a negative electrode, fabricating a positive electrode, preparing a nonaqueous electrolyte, layering or winding the positive electrode and the negative electrode with a separator interposed between the electrodes to form an electrode assembly with the positive and negative electrodes alternately overlapped, housing the electrode assembly in a battery case, and injecting the nonaqueous electrolyte into the battery case. The positive electrode can be obtained by directly layering the positive composite layer on a positive substrate or layering the positive composite layer on the positive substrate with an intermediate layer interposed therebetween. The positive composite layer is layered by applying a positive composite paste to the positive substrate. The negative electrode can be obtained by directly layering the negative composite layer on a negative substrate or layering the negative composite layer on the negative substrate with an intermediate layer interposed therebetween as with the positive electrode. The negative composite layer is layered by applying a negative composite paste including the solid graphite particles to the negative substrate. The positive composite paste and the negative composite paste may contain a dispersion medium. As the dispersion medium, it is possible to use, for example, an aqueous solvent such as water or a mixed solvent mainly composed of water or an organic solvent such as N-methylpyrrolidone or toluene.

A method for housing the negative electrode, the positive electrode, and the nonaqueous electrolyte and the like into the battery case can be performed in accordance with a known method. After the housing, by sealing an opening for the housing, an energy storage device can be obtained. The details of the respective elements configuring the energy storage device obtained by the manufacturing method are as described above.

The energy storage device is capable of keeping the capacity retention ratio after a charge-discharge cycle at a high rate from being decreased in the case of using graphite as the negative active material and increasing the negative electrode utilization factor in the full charge state of the energy storage device.

Other Embodiments

The energy storage device of the present invention is not limited to the embodiments described above, and various changes may be made without departing from the scope of the present invention. For example, to the configuration of an embodiment, the configuration of another embodiment can be added, and a part of the configuration of an embodiment can be replaced by the configuration of another embodiment or a well-known technique. Furthermore, a part of the configuration according to one embodiment can be removed. In addition, a well-known technique can be added to the configuration according to one embodiment.

In the above embodiment, the energy storage device has been described mainly in the form of a nonaqueous electrolyte secondary battery, but the energy storage device may be other energy storage devices. Examples of the other energy storage devices include capacitors (electric double-layer capacitors and lithium ion capacitors). Examples of the nonaqueous electrolyte secondary battery include a lithium ion nonaqueous electrolyte secondary battery.

The present invention can also be realized as an energy storage apparatus including the plurality of energy storage devices. In this case, the technique of the present invention may be applied to at least one energy storage device included in the energy storage apparatus. In one preferred aspect, the energy storage apparatus includes the energy storage device according to the above-mentioned embodiment, a detection unit, and a control unit. The detection unit detects a voltage between the positive electrode and the negative electrode of the energy storage device. As the detection unit, a conventionally known voltmeter, voltage sensor or the like can be used. The control unit is electrically connected to the detection unit, and is configured to stop charge of the energy storage device when the voltage detected by the detection unit is equal to or higher than a predetermined value. For example, the control unit can be configured to cut off an electrical connection between a charger and the energy storage device when the voltage becomes equal to or higher than the predetermined value in charging using the charger. The control unit can be composed of a computer and a computer program. In addition, the control unit may be partially or entirely composed of a processor including a semiconductor chip. In the energy storage apparatus according to one embodiment, when the voltage of the energy storage device is the predetermined value, a potential of the positive electrode is 4.2 V (vs. $Li/Li^+$) or lower. More specifically, the potential of the positive electrode at the time of stopping the charge is 4.2 V (vs. $Li/Li^+$) or lower. The potential of the positive electrode when the charge of the energy storage device is stopped by the control unit is preferably 4.1 V (vs. $Li/Li^+$) or lower, more preferably 4 V (vs. $Li/Li^+$) or lower. In some aspects, the potential of the positive electrode when the charge of the energy storage device is stopped by the control unit may be, for example, 3.8 V (vs. $Li/Li^+$) or lower, or 3.7 V (vs. $Li/Li^+$) or lower. In the energy storage apparatus in which the potential of the positive electrode when the charge is stopped is set as described above, the above-described effect can be more effectively exhibited. An assembled battery can be constituted using one or a plurality of energy storage devices (cells) of the present invention, and an energy storage apparatus can be constituted using the assembled battery. The energy storage apparatus can be used as a power source for an automobile, such as an electric vehicle (EV), a hybrid vehicle (HEV), or a plug-in hybrid vehicle (PHEV). The energy storage apparatus can be used for various power source apparatuses such engine starting power source apparatuses, auxiliary power source apparatuses, and uninterruptible power systems (UPSs).

FIG. 2 illustrates an example of an energy storage apparatus 30 formed by assembling energy storage units 20 in each of which two or more electrically connected energy storage devices 1 are assembled. The energy storage apparatus 30 may include a busbar (not illustrated) for electrically connecting two or more energy storage devices 1 and a busbar (not illustrated) for electrically connecting two or more energy storage units 20. The energy storage unit 20 or the energy storage apparatus 30 may include a state monitor (not illustrated) for monitoring the state of one or more energy storage devices.

EXAMPLES

Hereinafter, the present invention will be described in more detail with reference to Examples, but the present invention is not limited to the following Examples.

Example 1

(Fabrication of Negative Electrode)

Solid graphite particles with an aspect ratio of 3.0, an average particle size ($D_{50}$) of 3.0 μm, and a BET specific surface area of 3.9 $m^2/g$ as a negative active material, a styrene-butadiene rubber (SBR) as a binder, carboxymethyl cellulose (CMC) as a thickener, and water as a dispersion medium were mixed to prepare a negative composite paste. The mass ratios of the solid graphite particles, binder, and thickener were 96:3:1 in terms of solid content. Further, the actual charge capacity per mass of the solid graphite particles (the maximum chargeable capacity that can be actually stored reversibly by the active material) was 335 mAh/g.

The negative composite paste was prepared by adjusting the amount of water to adjust the viscosity and mixing using a multi-blender mill. The negative composite paste was applied to both surfaces of a negative substrate such that a non-layered part was formed at one end edge of a copper foil as the negative substrate, and dried to fabricate a negative active material layer. The coating amount of the negative composite (obtained by evaporating the dispersion medium from the negative composite paste) per unit area of one surface after drying was set to 4.82 $mg/cm^2$. After the drying, the negative active material layer was pressed with the use of a roll press so as to have a predetermined packing density, thereby obtaining a negative electrode.

(Fabrication of Positive Electrode)

(Positive Electrode)

A positive electrode with $LiFePO_4$ (LFP) as a positive active material was fabricated. The positive electrode contains the positive active material, polyvinylidene fluoride (PVDF) as a binder, and acetylene black as a conductive agent, and a positive composite paste was prepared using N-methylpyrrolidone (NMP) as a dispersion medium. The mass ratios of the positive active material, binder and conductive agent were 91:4:5. The positive composite paste was applied to both surfaces of a positive substrate such that a non-layered part was formed at one end edge of the positive substrate, dried, and pressed to fabricate a positive active material layer. The coating amount of the positive composite (obtained by evaporating the dispersion medium from the positive composite paste) per unit area of one surface after drying was set to 9.34 $mg/cm^2$. Further, an aluminum foil of 15 μm in thickness was used for the positive substrate.

In addition, an intermediate layer was disposed on the surface of the positive substrate. For the intermediate layer, an intermediate layer paste was provided by mixing a mixture of: N-methylpyrrolidone (NMP) as a solvent; acetylene black as a conductive agent; hydroxyethyl chitosan as a binder; and a pyromellitic acid as a crosslinking agent. The mass ratios of the conductive agent, binder, and crosslinking agent were 1:1:1 in terms of solid content. The intermediate layer paste was applied to both surfaces of the positive substrate with a gravure coating machine such that the applied amount of the intermediate layer per unit area after drying was 0.05 $mg/cm^2$, and dried.

(Nonaqueous Electrolyte)

A nonaqueous electrolyte was prepared by dissolving $LiPF_6$ of 1.2 $mol/dm^3$ in concentration in a solvent obtained by mixing an ethylene carbonate (EC), a dimethyl carbonate (DMC), and an ethyl methyl carbonate (EMC) at volume ratios 30:35:35.

(Separator)

As a separator, a polyethylene microporous film having a thickness of 15 μm was used.

(Energy Storage Device)

The positive electrode, the negative electrode, and the separator were layered to prepare an electrode assembly. Thereafter, the non-layered part of the positive substrate and the non-layered part of the negative substrate were respectively welded to a positive current collector and a negative current collector, and enclosed in a battery case. Next, the battery case was welded to a lid plate, the nonaqueous electrolyte was then injected into the case, and a case opening was sealed. In this manner, batteries (energy storage devices) according to Examples 1 to 6 and Comparative Examples 1 to 10 were obtained. The designed rated capacity of the battery is 8.0 Ah.

Examples 2 to 6 and Comparative Examples 1 to 10

Energy storage devices were obtained in the same manner as in Example 1 except for the structure, aspect ratio, and average particle size ($D_{50}$) of the negative active material, and the applied amount of the negative composite as shown in Table 1.

[Evaluation]

(Negative Electrode Utilization Factor)

The amount of charge (mAh/g) per mass of the negative active material in the full charge state of each energy storage device was measured by the above-mentioned method. Then, the proportion of the amount of charge mAh/g per mass of the negative active material in a full charge state to the theoretical capacity of 372 mAh/g per mass of graphite was determined, and regarded as the negative electrode utilization factor.

(Capacity Retention Ratio after Charge-Discharge Cycle)

(1) Initial Discharge Capacity Checking Test

The obtained respective energy storage devices were subjected to an initial discharge capacity checking test under the following conditions. After constant current charge at 1 C up to 3.5 V in a constant temperature bath at 25° C., constant voltage charge was performed at 3.5 V. With regard to the charge termination conditions, charge was performed until the current value in the constant voltage charge reached 0.01 C. After charge, a pause time of 10 minutes was provided, and then constant current discharge was performed at 1 C to 2.0 V at 25° C. Thus, the initial discharge capacity was measured.

(2) Capacity Retention Ratio after Charge-Discharge Cycle Integration Time of 300 Hours Each energy storage device after the measurement of the "initial discharge capacity" was stored in a constant temperature bath at 45° C. for 4 hours, and then subjected to constant current charge at 10 C to 3.5 V. With regard to the charge termination conditions, charge was performed until the voltage reached 3.5 V. Thereafter, constant current discharge was performed at 10 C to 2.0 V without any pause time. This charge-discharge was repeated with the cycle integration time of 100 hours defined as one period, the charge-discharge was stopped after the end of one period, and after storage at 25° C. for 4 hours, the discharge capacity was checked in the same manner as in (1) mentioned above. This operation was performed three times, and the discharge capacity checked for the third time was defined as a discharge capacity after a charge-discharge cycle integration time of 300 hours. The percentage of the discharge capacity after the charge-discharge cycle integration time of 300 hours with respect to the initial discharge capacity was calculated, and regarded as "the capacity retention ratio after the charge-discharge cycle integration time of 300 hours [%]".

Table 1 below shows the negative electrode utilization factor and the capacity retention ratio after the charge-discharge cycle integration time of 300 hours for each energy storage device.

From the foregoing results, it has been demonstrated that the energy storage device is capable of keeping the capacity retention ratio after a charge-discharge cycle at a high rate from being decreased in the case of using graphite as the active material for the negative electrode and increasing the negative electrode utilization factor.

TABLE 1

| | Negative Active Material | | | | | Evaluation Capacity Retention Ratio |
|---|---|---|---|---|---|---|
| | Structure | Aspect Ratio of Graphite Particle | Average Particle Size $D_{50}$ [μm] | Applied Amount of Negative Composite [mg/cm$^2$] | Negative Electrode Utilization Factor | after Charge-Discharge Cycle Integration Time of 300 hours at 45° C. [%] |
| Comparative Example 1 | hollow graphite | 1.6 | 8.5 | 5.90 | 0.54 | 88.0 |
| Comparative Example 2 | hollow graphite | 1.6 | 8.5 | 4.82 | 0.68 | 56.2 |
| Comparative Example 3 | hollow graphite | 1.6 | 8.5 | 4.26 | 0.78 | 20.5 |
| Comparative Example 4 | hollow graphite | 1.6 | 8.5 | 3.82 | 0.88 | 10.2 |
| Comparative Example 5 | solid graphite | 3.0 | 3.0 | 5.90 | 0.54 | 89.7 |
| Example 1 | solid graphite | 3.0 | 3.0 | 4.82 | 0.68 | 90.7 |
| Example 2 | solid graphite | 3.0 | 3.0 | 4.26 | 0.78 | 87.4 |
| Example 3 | solid graphite | 3.0 | 3.0 | 3.82 | 0.88 | 85.1 |
| Comparative Example 6 | solid graphite | 10.0 | 10.3 | 5.48 | 0.54 | 80.8 |
| Comparative Example 7 | solid graphite | 10.0 | 10.3 | 4.54 | 0.68 | 51.6 |
| Comparative Example 8 | solid graphite | 10.0 | 10.3 | 4.04 | 0.78 | 18.8 |
| Comparative Example 9 | solid graphite | 10.0 | 10.3 | 3.64 | 0.88 | 9.4 |
| Comparative Example 10 | solid graphite | 4.2 | 4.4 | 5.90 | 0.54 | 88.1 |
| Example 4 | solid graphite | 4.2 | 4.4 | 4.82 | 0.68 | 87.1 |
| Example 5 | solid graphite | 4.2 | 4.4 | 4.26 | 0.78 | 83.9 |
| Example 6 | solid graphite | 4.2 | 4.4 | 3.82 | 0.88 | 81.7 |

As shown in Table 1, Examples 1 to 6 containing the negative active material containing, as a main component, solid graphite particles with a negative electrode utilization factor of 0.65 or more and an aspect ratio of 1 or more and 5 or less were favorable in the effect of suppressing the decrease in capacity retention ratio after the charge-discharge cycle.

In contrast, according to Comparative Examples 2 to 4 containing the negative active materials containing the hollow graphite particles with the negative electrode utilization factors of 0.65 or more and the aspect ratios of 1 or more and 5 or less as a main component and Comparative Examples 7 to 9 containing the negative active materials containing the solid graphite particles with the aspect ratios in excess of 5 as a main component, the capacity retention ratios after the charge-discharge cycles were significantly decreased.

In addition, from the results of Comparative Example 1, Comparative Example 5, Comparative Example 6, and Comparative Example 10, in the case of the negative electrode utilization factor of less than 0.65, the effect of suppressing the decrease in capacity retention ratio after the charge-discharge cycle was favorable even in the case of containing the negative active material containing hollow graphite particles as a main component or the negative active material containing solid graphite particles with an aspect ratio in excess of 5 as a main component.

From the foregoing, it is determined that the use of specific solid graphite particles as the negative active material allows the energy storage device to suppress the decrease in capacity retention ratio after a charge-discharge cycle at a high rate, which is a problem when the negative electrode utilization factor satisfies 0.65 or more.

INDUSTRIAL APPLICABILITY

The present invention is suitably used as a nonaqueous electrolyte energy storage device including a nonaqueous electrolyte secondary battery used as a power source that requires quick charge, for electronic devices such as personal computers and communication terminals, automobiles such as EV, HEV, and PHEV, and the like.

In addition, preferable applications of the present invention include a large-size lithium ion secondary battery. Examples thereof include a large-size lithium ion secondary battery that is a large-capacity type battery with a battery capacity of 5.0 Ah or more (for example, 5.0 Ah or more and 100 Ah or less) and is assumed to be used in a charge-discharge cycle including high-rate discharge of 3 C or more (for example, from 3 C to 50 C). The nonaqueous electrolyte energy storage device according to the present invention can be suitably applied to the large-size lithium ion secondary battery mentioned above, because of the suppressed decrease in capacity retention ratio after a charge-discharge cycle at a high rate.

DESCRIPTION OF REFERENCE SIGNS

1: energy storage device
2: electrode assembly
3: battery case
4: positive electrode terminal
41: positive current collector
5: negative electrode terminal
51: negative current collector
20: energy storage unit
30: energy storage apparatus

The invention claimed is:

1. An energy storage device comprising:

a negative electrode; and a positive electrode, wherein the negative electrode includes a negative substrate and a negative active material layer directly or indirectly layered on the negative substrate, the negative active material layer contains a negative active material, the negative active material contains solid graphite particles as a main component, wherein, in a cross section of each one of the solid graphite particles observed in a SEM image acquired by a scanning electron microscope (SEM), an area ratio excluding voids in each one of the solid graphite particles relative to a total area of each one of the solid graphite particles is 95% or more, an aspect ratio of each one of the solid graphite particles is 2.0 or more and 5 or less, and a negative electrode utilization factor that is a proportion of an amount of charge per mass of the negative active material in a full charge state to a theoretical capacity per mass of graphite is 0.65 or more.

2. The energy storage device according to claim 1, wherein the negative electrode utilization factor is 0.80 or more and 0.90 or less.

3. The energy storage device according to claim 1, wherein the solid graphite particles have an average particle size of 5 μm or less.

4. The energy storage device according to claim 1, wherein the positive electrode contains a polyanion compound as a positive active material.

* * * * *